United States Patent [19]

Makowski et al.

[11] 4,118,360

[45] Oct. 3, 1978

[54] OIL EXTENDED ELASTOMERIC COMPOSITIONS

[75] Inventors: Henry S. Makowski, Scotch Plains; Charles P. O'Farrell, Clark, both of N.J.

[73] Assignee: Exxon Research & Engineering Co., Linden, N.J.

[21] Appl. No.: 855,555

[22] Filed: Nov. 29, 1977

[51] Int. Cl.$^2$ ................................................ C08K 5/10
[52] U.S. Cl. ........................ 260/31.2 R; 260/336 AQ
[58] Field of Search .................. 260/79.3 R, 33.6 AQ, 260/33.8, 31.2

[56] References Cited

U.S. PATENT DOCUMENTS

| | | | |
|---|---|---|---|
| 3,642,728 | 2/1972 | Canter | 260/79.5 B |
| 3,974,240 | 8/1976 | Bock et al. | 260/897 B |
| 4,007,149 | 2/1977 | Burton et al. | 260/29.7 B |

*Primary Examiner*—Lewis T. Jacobs
*Attorney, Agent, or Firm*—Richard E. Nanfeldt

[57] ABSTRACT

This invention relates to an improved process for the manufacture of a blend composition of a neutralized sulfonated elastomeric polymer which includes the steps of sulfonating an elastomeric polymer dissolved in a solvent to form an acid form of the sulfonated elastomeric polymer. The solution of the acid form of the sulfonated elastomeric polymer is quenched with an oxirane to form a polymeric hydroxyalkyl sulfonate. A non-polar backbone process oil is added thereby plasticizing the polymeric backbone of the hydroxyalkyl sulfonate. The hydroxyalkyl sulfonate is reacted with a metal carboxylate to form equal molar portions of a solid gel-free neutralized sulfonated elastomeric polymer and a hydroxyalkyl carboxylate ester.

33 Claims, No Drawings

OIL EXTENDED ELASTOMERIC COMPOSITIONS

BACKGROUND OF THE INVENTION

1. Field of the Invention

This invention relates to an improved process for the manufacture of a blend composition of a neutralized sulfonated elastomeric polymer which includes the steps of sulfonating an elastomeric polymer dissolved in a solvent to form an acid form of the sulfonated elastomeric polymer. The solution of the acid form of the sulfonated elastomeric polymer is quenched with an oxirane to form a polymeric hydroxyalkyl sulfonate. A non-polar backbone process oil is added thereby plasticizing the polymeric backbone of the hydroxyalkyl sulfonate. The hydroxyalkyl sulfonate is reacted with a metal carboxylate to form equivalent portions of a solid gel-free neutralized sulfonated elastomeric polymer and a hydroxyalkyl carboxylate ester.

These blend compositions can be readily processed due to their superior rheological properties on conventional plastic fabrication equipment into elastomeric articles having excellent physical properties and desirable rubbery characteristics.

The hydroxyalkyl esters of this invention may be schematically represented as follows:

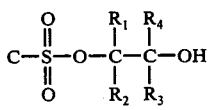

wherein $\sim C \sim$ is one or more carbon atoms in one or more molecules comprising a polymer and is in the polymer backbone-chain of carbon atoms, or is in an acyclic, alicyclic, or aromatic group which is pendant to the backbone chain; $R_1$, $R_2$, $R_3$ and $R_4$ are independently selected from the group consisting of hydrogen, $C_1$ to $C_{18}$ straight and branched chain acyclic, alicyclic, aryl, alkylaryl, arylalkyl groups and functional derivatives thereof.

Products which have a limited concentration of ionic groups covalently bonded to one or more carbon atoms of one or more molecules comprising a polymer, when partially or completely neutralized with mono or polyvalent cations such as sodium, zinc, magnesium, lead, ammonium and quaternary ammonium compounds are generally referred to as ionomers. The ionic groups can be covalently bonded to carbon atoms comprising the backbone chain of the polymer, which chain of carbon atoms may be interrupted by hetero atoms such as oxygen, nitrogen and sulfur, or the ionic groups can be bonded to acyclic, alicyclic or aromatic groups which are pendant to the backbone chain. Solid gel-free ionomers differ from covalently crosslinked elastomers, such as vulcanized rubber, in that while ionomers can be elastomeric at ordinary temperatures, at elevated temperatures they can be extruded, compression molded, blow molded, sheeted, vacuum formed and injection molded.

Sulfonated polymers i.e. those containing free sulfonic acid groups are known to be relatively unstable and are difficult to process in safety or without degradation in conventional plastic or rubber equipment at elevated temperatures. Except for this tendency to degrade it would be advantageous to process the free acid since the relatively weak ionic associations among the acid groups result in a low polymer viscosity permitting easy mixing with neutralizing agents extender oils, plasticizers, fillers, and other polymers. Such extended systems can then be mixed and reacted with a neutralizing agent such as metallic oxides, hydroxides, and alkoxides or salts of weak acids such as an acetate or stearate to yield the ionomer.

On the other hand, if the sulfonated polymer is first neutralized with a counterion and the ionomeric product isolated, it is found to possess an extraordinarily high viscosity even at elevated temperatures commonly used for processing thermoplastic polymers in conventional equipment and must be mixed with other materials by solution techniques.

A major object of this invention is the preparation of low viscosity, thermally and hydrolytically stable esters of sulfonated polymers which are readily convertible to ionomers by reaction with a basic substance. A further object of this invention is the preparation of oil extended ionomeric blend compositions which comprises reacting a polymer having one or more sulfonic acid groups covalently linked or bonded to one or more carbon atoms in one or more molecules comprising said polymer with an oxirane to form a hydroxyalkyl ester, then adding an oil and then reacting said ester with a basic substance selected from the group consisting of mono and polyvalent metallic oxides, hydroxides, alkoxides and salts of acids having a lower $K_a$ then the sulfonic acid. These, and other objects of this invention will be further apparent in the detailed description of the invention which follows below.

2. Description of the Prior Art

The reaction of an oxirane (e.g. ethylene oxide) with a sulfonic acid to form a hydroxyethyl ester is old in the art. U.S. Pat. No. 2,208,581 discloses the preparation of surface active agents by the reaction of low molecular weight sulfonic acids with a compound containing an olefin oxide.

In a first copending application concerning preparation of ionomeric latex epoxides are used to quench the sulfonation reaction and allow the cement to be processable in a unique latex process. However, this copending application fails to teach a method for the isolation of a solid, gel free, hydrolytically stable polymeric hydroxyalkyl sulfonate having desirable physical and rheological properties, wherein these polymeric sulfonates are readily convertible to metal sulfonates during and after processing thereby permitting fabrication on conventional plastic type equipment to a variety of useful articles. Furthermore, it is completely unpredictable that a solid, gel free, hydrolytically stable polymeric hydroxyalkyl sulfonate is capable of being isolated in a steam stripping operation under acidic conditions and at higher temperatures based upon the published literature on the hydrolytic stability of low molecular weight alkyl sulfonates. No references have been found in the chemical or patent literture for the preparation of hydroxyalkyl esters of polymeric sulfonic acids or for the preparation of ionomers from these esters by reaction with a basic compound or salt of an acid having a lower $K_a$ than the sulfonic acid.

In another copending application, Ser. No. 855,763, filed Nov. 29, 1977, entitled "Polymeric Hydroxyalkyl Sulfonates" herein incorporated by reference, the preparation of polymeric hydroxyalkyl sulfonates are described wherein an acid form of a sulfonated polymer is reacted with an oxirane having the general formula:

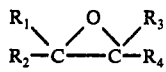

wherein $R_1$, $R_2$, $R_3$ and $R_4$ are independently selected from the group consisting of hydrogen and $C_1$ to $C_{18}$ straight and branched chain acyclic, alicyclic, aryl, alkylaryl, arylalkyl radicals and functional derivatives thereof. The improved blend compositions of the present instant invention provide materials of superior rheological properties.

SUMMARY OF THE INVENTION

It has been found surprisingly that gel-free compositions formed from blends of neutralized sulfonated elastomeric materials in particular a select class of neutralized sulfonated elastomeric polymers, a non-polar backbone oil and a hydroxyalkyl carboxylate ester have suitable rheological and physical properties for the formation of elastomeric articles, by extrusion or by injection molding.

Accordingly, it is an object of our present invention to provide unique and novel solid, gel-free compositions of matter by a unique and novel process for producing high performance elastomeric articles by an extrusion or injection molding process, wherein the compositions of the elastomeric article have a viscosity at 0.73 sec$^{-1}$ at 200° C. of less than about $1.0 \times 10^5$ poise, a melt index at 190° C. and 250 psi greater than about 6 g/10 minutes and a Shore A Hardness of about 15 to about 80.

It is the object of the instant invention to describe a class of compounds based on sulfonated ethylenepropylene terpolymers which can be processed on plastics type extrusion equipment at high rates and which possess improved physical characteristics such as low temperature flexibility and rubbery feel. One of the essential aspects of the present invention comprises the discovery that only a restricted class of the subject sulfonated elastomers may be readily employed for extrusion fabrication. The restrictions are primarily associated with processing and product performance characteristics. These characteristics are to a degree modulated by the type and concentration of various compounding ingredients. The compositions of the instant invention will, therefore, involve a class of compositions based on a restrictive class of sulfonated elastomers.

A substantial segment of the plastics and rubber fabrication industry employs a fabrication technique known as extrusion to form articles which can be classified as sheet, profiles, tubing and film. The applications employing these fabrication techniques such as windshield wipers, weather stripping, refrigerator door seals, garden hose, etc. require materials which are flexible and tough. Two broad classifications of materials which have been used are vulcanized elastomers and plasticized thermoplastics such as polyvinyl chloride (PVC). The fabrication of extrusion articles based on vulcanized elastomers is a major item of cost involving the vulcanization procedure. Not only is this step costly from an energy intensive viewpoint, but it is time consuming. The use of plasticating extrusion for thermoplastic materials is more economical and results in high extrusion rates for materials such as plasticized PVC. While these materials possess a degree of flexibility, they do not have a good rubbery feel or good low temperature flexibility. It is therefore desirable to have materials which can be processed on plastics type extrusion equipment at convention plastics rates and which possess the flexibility and subjective rubbery characteristics of vulcanized elastomers.

The polymeric hydroxyalkyl sulfonates of the copending application entitled "Polymeric Hydroxyalkyl Sulfonates" are ideally suitable in the formation of the gel-free compositions of the instant invention.

GENERAL DESCRIPTION

This present invention relates to unique and novel solid, gel-free blend compositions of a neutralized sulfonated polymer, a non-polar process oil, and a hydroxyalkyl carboxylate ester wherein the resultant composition has a viscosity at 0.73 sec$^{-1}$ at 200° C. of less than about $10^5$ poise and a melt index at 190° C. and 250 psi of greater than about 6 g/minutes, wherein the compositions are readily processable in a conventional extrusion or injection molding process into a high performance elastomeric article such as a soft injection molded sneaker sole. The resultant elastomeric article has excellent low temperature flexibility, excellent flex fatigue, superior dimensional stability, good resilience, a rubber-like feel, and a Shore A Hardness of about 15 to about 80.

The neutralized sulfonated elastomeric polymers of this present instant invention are derived from unsaturated polymers which include low unsaturated elastomeric polymers such as Butyl rubber, or EPDM terpolymers.

Alternatively, other unsaturated polymers are selected from the group consisting essentially of partially hydrogenated polyisoprenes, partially hydrogenated polybutadienes, Neoprene, styrene-butadiene copolymers or isoprene-styrene random copolymers. The expression "Butyl rubber" as employed in the specification and claims is intended to include copolymers made from a polymerization reaction mixture having therein from 70 to 99.5% by weight of an isoolefin which has about 4 to 7 carbon atoms, e.g. isobutylene and about 0.5 to 30% by weight of a conjugated multiolefin having from about 4 to 14 carbon atoms, e.g. isoprene. The resulting copolymer contains 85 to 99.8% by weight of combined isoolefin and 0.2 to 15% of combined multiolefin.

Butyl rubber generally has a Staudinger molecular weight of about 20,000 to about 500,000, preferably about 25,000 to about 400,000 especially about 100,000 to about 400,000, and a Wijs Iodine No. of about 0.5 to 50, preferably 1 to 15. The preparation of Butyl rubber is described in U.S. Pat. No. 2,356,128 which is incorporated herein by reference.

For the purposes of this invention, the Butyl rubber may have incorporated therein from about 0.2 to 10% of combined multiolefin; preferably about 0.5 to about 6%; more preferably, about 1 to about 4%, e.g. 2%.

Illustrative of such a Butyl rubber is Exxon Butyl 365 (Exxon Chemical Co.), having a mole percent unsaturation of about 2.0% and a Mooney viscosity (ML, 1 + 3, 212° F.) of about 40–50.

Low molecular weight Butyl rubbers, i.e. Butyl rubbers having a viscosity average molecular weight of about 5,000 to 85,000 and a mole percent unsaturation of about 1 to about 5% may be sulfonated to produce the polymers useful in this invention. Preferably, these polymers have a viscosity average molecular weight of about 25,000 to about 60,000.

The EPDM terpolymers are low unsaturated polymers having about 1 to about 10.0 wt.% olefinic unsaturation, more preferably about 2 to about 8, most preferably about 3 to 7 defined according to the definition as found in ASTM-D-1418-64 and is intended to mean terpolymers containing ethylene and propylene in the backbone and a diene in the side chain. Illustrative methods for producing these terpolymers are found in U.S. Pat. No. 3,280,082, British Pat. No. 1,030,289 and French Pat. No. 1,386,600, which are incorporated herein by reference. The preferred polymers contain about 40 to about 75 wt.% ethylene and about 1 to about 10 wt.% of a diene monomer, the balance of the polymer being propylene. Preferably, the polymer contains about 45 to about 70 wt.% ethylene, e.g. 50 wt.% and about 2.6 to about 8.0 wt.% diene monomer, e.g. 5.0 wt.%. The diene monomer is preferably a non-conjugated diene.

Illustrative of these non-conjugated diene monomers which may be used in the terpolymer (EPDM) are 1,4-hexadiene, dicyclopentadiene, 5-ethylidene-2-norbornene, 5-methylene-2-norbornene, 5-propenyl-2-norbornene, and methyl tetrahydroindene.

A typical EPDM is Vistalon 2504 (Exxon Chemical Co.), a terpolymer having a Mooney viscosity (ML, 1 + 8, 212° F.) of about 40 and having an ethylene content of about 50 wt.% and a 5-ethylidene-2-norbornene content of about 5.0 wt.%. The Mn of Vistalon 2504 is about 47,000, the Mv is about 145,000 and the Mw is about 174,000.

Another EPDM terpolymer Vistalon 2504-20 is derived from Vistalon 2504 (Exxon Chemical Co.) by a controlled extrusion process, wherein the resultant Mooney viscosity at 212° F. is about 20. The Mn of Vistalon 2504-20 is about 26,000, the Mv is about 90,000 and the Mw is about 125,000.

Nordel 1320 (DuPont) is another terpolymer having a Mooney viscosity at 212° F. of about 25 and having about 53 wt.% of ethylene, about 3.5 wt.% of 1,4-hexadiene, and about 43.5 wt.% of propylene.

The EPDM terpolymers of this invention have a number average molecular weight (Mn) of about 10,000 to about 200,000, more preferably of about 15,000 to about 100,000, most preferably of about 20,000 to about 60,000. The Mooney viscosity (ML, 1 + 8, 212° F.) of the EPDM terpolymer is about 5 to about 60, more preferably about 10 to about 50, most preferably about 15 to about 40. The Mv of the EPDM terpolymer is preferably below about 350,000 and more preferably below about 300,000. The Mw of the EPDM terpolymer is preferably below about 500,000 and more preferably below about 350,000.

In carrying out the invention, the elastomeric polymer is dissolved in a non-reactive solvent such as a chlorinated aliphatic solvent, chlorinated aromatic hydrocarbon, an aromatic hydrocarbon, or an aliphatic hydrocarbon such as carbon tetrachloride, dichloroethane, chlorobenzene, toluene, cyclohexane, pentane, isopentane, hexane, isohexane or heptane. The preferred solvents are the lower boiling aliphatic hydrocarbons. A sulfonating agent is added to the solution of the elastomeric polymer and non-reactive solvent at a temperature of about −100° C. to about 100° C. for a period of time of about 1 to about 60 minutes, most preferably at room temperature for about 5 to about 45 minutes; and most preferably about 15 to about 30. Typical sulfonating agents are described in U.S. Pat. Nos. 3,642,728 and 3,836,511, previously incorporated herein by reference. These sulfonating agents are selected from an acyl sulfate, a mixture of sulfuric acid and an acid anhydride or a complex of a sulfur trioxide donor and a Lewis base containing oxygen, sulfur, or phosphorous. Typical sulfur trioxide donors are $SO_3$, chlorosulfonic acid, fluorosulfonic acid, sulfuric acid, oleum, etc. Typical Lewis bases are: dioxane, tetrahydrofuran, tetrahydrothiophene or triethyl phosphate. The most preferred sulfonation agent for this invention is an acyl sulfate selected from the group consisting essentially of benzoyl, acetyl, propionyl or butyryl sulfate. The acyl sulfate can be formed in situ in the reaction medium or pregenerated before its addition to the reaction medium in a chlorinated aliphatic or chlorinated aromatic hydrocarbon.

The amount of desirable sulfonation depends on the particular application. Preferably, the elastomeric polymer is sulfonated at about 5 to about 60 meq. $SO_3H/100g$ of polymer, more preferably at about 10 to about 50 meq. $SO_3H/100$ grams of polymer, and most preferably at about 20 to about 40 meq. $SO_3H/100$ grams of polymer. The meq. of $SO_3H/100$ grams of polymer can be determined by dissolving the acid form of the sulfonated polymer in a mixed solvent of 95 parts toluene and 5 parts methanol at a concentration level of 50 grams per liter of solvent. The acid form is titrated with ethanolic sodium hydroxide to an Alizarin-Thymolphthalein endpoint. Dietert sulfur analysis and the acid titration agree with regard to combined sulfur when a sulfonation is conducted under controlled conditions.

It should be pointed out that neither the sulfonating agent nor the manner of sulfonation is critical, provided that the sulfonating method does not degrade the polymer backbone.

The sulfonation reaction can be terminated and the sulfonated polymer converted to a hydroxyethyl ester by the addition of an oxirane to the reaction mixture, or the sulfonated polymer recovered by precipitation for example with a polar solvent such as methanol or acetone, and after removal of the polar solvent, redissolved in a non-reactive solvent and converted to the hydroxyalkyl ester by reaction with an oxirane. (See Copending Appln. C-438)

Oxiranes which are suitable for the practice of this invention have the general formula:

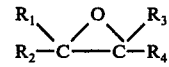

wherein $R_1$, $R_2$, $R_3$ and $R_4$ are independently selected from the group consisting of hydrogen and $C_1$ to $C_{18}$ straight and branched chain acyclic, alicyclic, aryl, alkylaryl, arylalkyl radicals and functional derivatives thereof. Non-limiting examples of suitable oxiranes include ethylene oxide, propylene oxide, allyl glycidyl ether, styrene oxide, epichlorohydrin and epoxidized methyl oleate.

Ethylene glycol, propylene glycol and their monomethyl or monoethyl ethers are useful as their mono sodium or potassium salts for the preparation of the hydroxyethyl esters from polymers which have been chlorosulfonated.

In accordance with this invention, polymers having sulfonic acid groups covalently linked to carbon atoms comprising the polymer can be reacted with an oxirane to yield hydroxyalkyl esters which are free of acid and can be isolated as for example by steam stripping or precipitation with a polar solvent and the product dried, mixed, compounded and the gel-free hydroxyalkyl sulfonate partially or completely converted to the metal sulfonate to form an ionomer by mixing with a mono or polyvalent basic compound or salt of an acid having a lower $K_a$ than the sulfonic acid in conventional equipment without decomposition or corrosion. The hydroxyethyl esters are:

(1) Stable to hydrolysis under steam stripping conditions;

(2) Thermally stable at the temperatures used in processing thermoplastic and elastomeric materials;

(3) Convertible to an ionomer by mixing in bulk with a basic compound or salt of a weak acid, followed by the application of heat; and ASTM Type 104B as defined in ASTM-D-2226-70, aromatics ASTM Type 102 or naphthenics ASTM Type 104A, wherein the oil has a flash point by the Cleveland open cup of at least 350° F., a pour point of less than 40° F., a viscosity of about 70 to about 3000 s.s.u.'s at 100° F. and a number average molecular weight of about 300 to about 1,000, and more preferably about 300 to 750. The preferred process oils are paraffinics. Table I illustrates typical oils encompassed by the scope of this invention.

The oils are incorporated into the blend composition at a concentration level of about 5 to about 200 parts per hundred; more preferably at about 5 to about 150, and most preferably at about 10 to about 100.

TABLE I

| Type Oil | Oil Code # | Viscosity ssu (100° F) | $M_n$ | % Polars | % Aromatic | % Saturates |
|---|---|---|---|---|---|---|
| Paraffinic | Sunpar 115 | 155 | 400 | 0.3 | 12.7 | 87.0 |
| Paraffinic | Sunpar 180 | 750 | 570 | 0.7 | 17.0 | 82.3 |
| Paraffinic | Sunpar 2280 | 2907 | 720 | 1.5 | 22.0 | 76.5 |
| Aromatic | Flexon 340 | 120 | — | 1.3 | 70.3 | 28.4 |
| Naphthenic | Flexon 765 | 505 | — | 0.9 | 20.8 | 78.3 |
| Aromatic | Sundex 790 | 3000 | — | 5.4 | 59.3 | 35.3 |
| Naphthenic | Sunthene 4240 | 2206 | — | 1.1 | 43.9 | 55.0 |

(4) Permit the preparation of ionomers which are free of acid when less than the stoichiometric quantity, based on the sulfonic acid content, of a basic compound or salt is used to convert the ester to an ionomer.

The hydroxyalkyl sulfonates and the neutralized sulfonated elastomeric polymers are gel-free. Gel is measured by stirring a given weight of the polymeric hydroxyalkyl sulfonate in a solvent comprised of 95 toluene/5 methanol at a concentration of 5 wt.%, for 24 hours, allowing the mixture to settle, withdrawing a weighed sample of the supernatant solution and evaporating to dryness.

The products and the process of this invention thus avoid all of the difficulties associated with working with the free acid or solution neutralized products.

The process comprises dissolving the polymer at a concentration in the range of about 3 to about 25 wt.% in a non-reactive solvent, sulfonating the polymer to the desired degree with an appropriate sulfonating agent, reacting the sulfonated polymer, either before isolation or after isolation and purification, in a solvent with an appropriate oxirane, separating the reaction product of the sulfonated polymer with the oxirane from the solvent and converting said reaction product to an ionomer by reaction with about 10 to more than 100% of the stoichiometric proportion of a metallic base or salt of an acid having a lower $K_a$ than the sulfonic, based on the sulfonic acid content of said sulfonated polymer, and recovering said ionomer.

A non-polar process oil can be added to a cement of the hydroxyalkylated, sulfonated polymer. After a homogeneous mixture has been obtained, the blend of a hydroxyalkylated sulfonated polymer and the non-polar process oil is isolated as a solid, gel-free blend composition by conventional steam stripping methods. Alternatively, the hydroxyalkylated, sulfonated polymer can be first isolated from the cement by steam stripping as a gel-free solid. The non-polar process oil can be compounded into the solid gel-free hydroxyalkylated, sulfonated polymer in an extruder or in conventional mixing equipment such as a Banbury mixer or on a rubber mill.

The oils employed in the present invention are non-polar process oils having less than about 6 wt.% polar type compounds as measured by molecular type clay gel analysis. These oils are selected from paraffinics The oil extended solid, gel-free hydroxyalkylated sulfonated polymer is converted into a neutralized sulfonated elastomeric polymer by reacting it with a metal containing base. The metal containing base is a base such as mono and polyvalent metallic oxides, hydroxides and alkoxides, or salts of weak acids such as carboxylates of which acetates, laurates and stearates are non-limiting examples. Preferred are metal salts of carboxylic acids.

When a metal carboxylate is used to neutralize the polymeric sulfonic acid, a carboxylic acid is released.

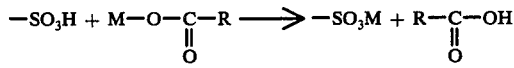

When the polymeric sulfonic acids are neutralized in bulk with the lower molecular weight metal carboxylates, the presence of the generated carboxylic acid, e.g. acetic acid, is undesirable because of odor and possible corrosion. The higher molecular weight carboxylic acids, such as stearic acid, are not odoriferous or corrosive. However, these higher molecular weight carboxylic acids, which are excellent flow improvers at elevated temperatures, also exert deleterious effects upon ionomer physical properties at lower temperatures and so are less desirable than other plasticizers.

The reaction between metal carboxylate and hydroxyalkyl sulfonate produces a mixture of the metal sulfonate and a hydroxyalkyl carboxylate ester in equivalent proportion for complete neutralization.

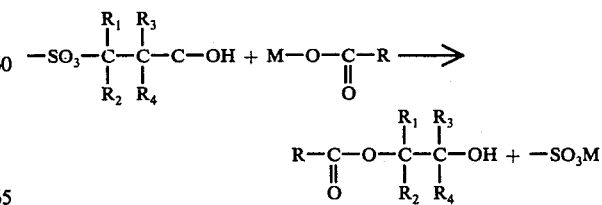

The lower molecular weight hydroxyalkyl carboxylates are not odoriferous or corrosive as the corresponding carboxylic acids. The higher molecular weight carboxylates are not as deleterious to physical properties as are the corresponding carboxylic acids.

The metals which are preferred for the formation of ionic crosslinks of the sulfonated polymer are selected from the group consisting of Groups I-A, II-A, I-B or II-B of the Periodic Table of Elements and lead, aluminum, iron and antimony. Most preferred are bases and fatty acid salts of zinc, magnesium, barium, sodium and lead.

The oil incorporated into the blend compositions of the present invention, in conjunction with the type of elastomeric polymer, the degree of sulfonation, and the metal counterion of the neutralized sulfonated elastomeric polymer and the formed hydroxyalkyl carboxylate ester give materials processable by extrusion or injection molding processes into elastomeric articles having the desirable physical and rheological properties. These combined physical properties and rheological processability characteristics were not previously obtainable in the aforementioned U.S. patents which were previously incorporated herein by reference.

Conversion of the uncompounded or compounded hydroxyethyl sulfonate by means of a metal carboxylate is readily accomplished at elevated temperature, for example 120° C. to 260° C., most preferably 150° C. to 200° C. These temperatures are obtainable in equipment used for processing plastic and elastomeric materials such as Banbury mixers and extruders. Ionomers made by the bulk neutralization of the hydroxyalkylated ester of the sulfonated polymer permits the formation of compounds with excellent processability for extrusion, injection molding, vacuum forming, compression molding and similar operations. This invention also permits a polymer to be sulfonated at one site and shipped as the hydroxyalkyl ester in a stable, corrosion-free state to a formulator at another site who can then prepare a variety of ionomers best suited to a particular use.

The compounding of the additives with the polymeric hydroxyalkyl sulfonate can be done prior to the addition of the neutralizing agent, wherein the neutralizing agent is added subsequently to the blend of the additives and polymeric hydroxyalkyl sulfonate. Alternatively, the additives and neutralizing agent can be compounded with the polymeric hydroxyalkyl sulfonate at a temperature below about 100° C. After a homogenous blend has been achieved, the temperature of compound is increased to a temperature of about 120° C. to about 260° C. in order to effect neutralization.

The advantages of both the rheological and physical properties of the blend compositions of the present invention can be more readily appreciated by reference to the following examples. Unless otherwise specified, all measurements are in parts per hundred by weight.

The polymeric hydroxyalkyl sulfonates of the copending application entitled "Polymeric Hydroxyalkyl Sulfonates" are ideally suitable in the formation of the gel-free compositions of the instant invention.

EXAMPLE 1

EPDM comprising 50 wt.% of ethylene, 45 wt.% of propylene and 5 wt.% of 5-ethylidene-2-norbornene having a Mooney viscosity (ML, 1 + 8, 212° F.) of about 20 was sulfonated as follows: to a well stirred solution of 800 grams of the polymer and 45.9 ml (486 mmoles) of acetic anhydride in 8.0 liters of Exxon hexane at room temperature was slowly added 16.8 ml (300 mmoles) of concentrated sulfuric. The mixture was stirred for 30 minutes at room temperature, and the sulfonation reaction was terminated through the addition of 23.2 g (400 mmoles) of propylene oxide. Then 4.0 g of Antioxidant 2246 was added, and the reaction mixture was stirred for 30 minutes. The viscosity of the reaction mixture increased after the addition of the propylene oxide.

The polymeric hydroxypropyl sulfonate was isolated by steam stripping, pulverizing the polymer in a Waring blender with water, and drying the resultant wet crumb on a rubber mill at about 120° F. The product contained 33.4 meq. of sulfonate groups/100 g polymer as calculated from the Dietert sulfur analysis (1.07 wt.% sulfur).

EXAMPLE 2

On a cool rubber mill was mixed zinc stearate (28.4 phr) with the polymeric hydroxypropyl sulfonate described in Example 1. Conversion of the hydroxypropyl sulfonate to the zinc sulfonate ionomer was accomplished by heating the molds for 30 minutes at 350° F. The resultant zinc ionomer had the following properties:

Rex Durometer, Type A, Hardness = 70
Melt Index (190° C., 250 psi) = 4.5 g/10 minutes
300% Modulus = 390 psi
Tensile Strength = 1580 psi
Elongation = 650%.

EXAMPLE 3

In 375 ml cyclohexane and 25 ml ethanol was dissolved 20 g of the polymeric hydroxypropyl sulfonate described in Example 1. To the solution was added 4.0 g of Sundex 790, an aromatic process oil. This corresponds to 20 parts of oil per 100 of polymer. The resultant solution was placed in a shallow pan, and most of the solvent was permitted to evaporate in a fume hood. To remove the final traces of solvent the pan was placed in a vacuum oven at 80° C. and dried to constant weight. The oil extended polymer was homogenized on a rubber mill and handled very easily. It was mixed with zinc stearate at a ratio of 28.4 g (90 meq.) of zinc stearate per 100 of polymer. The conversion of the hydroxypropyl sulfonate to the zinc sulfonate ionomer was effected by heating in molds for 30 minutes at 350° F.

The oil extended zinc ionomer had a melt index at 190° C. and under 250 psi of 12.8 g/10 minutes. This corresponds to an apparent viscosity of about $2 \times 10^4$ poise at 200° C. and at a shear rate of 0.74 sec$^{-1}$. The oil extended ionomer thus was readily processable. It was soft and rubbery with a Rex Durometer, Type A hardness of 53. It possessed a tensile strength of 950 psi and an elongation of 740%.

This example illustrates the preparation of an oil extended ionomer with good flow and good physical properties by first incorporating oil into a polymeric hydroxyalkyl sulfonate and converting it to the zinc ionomer through reaction with zinc stearate. It further illustrates the use of an aromatic oil.

EXAMPLE 4

According to the procedure described in Example 3 an oil extended polymeric hydroxypropyl sulfonate was prepared using 100 parts of Sunthene 4240, a naphthenic process oil, per 100 parts of the polymer described in Example 1. To the oil extended stock on a rubber mill was added and mixed 34.8 g (90 meq.) of lead stearate/100 polymer. The conversion of the hydroxypropyl sulfonate to the lead sulfonate ionomer was effected by heating in molds for 30 minutes at 350° F.

The oil extended lead ionomer had a melt index at 190° C. and under 24 psi of 4.0 g/10 minutes. It possessed a Rex Durometer, Type A hardness of 40. Thus it was easily processable and soft and rubbery. The product had a tensile strength of 750 psi and an elongation of 550%.

This example illustrates the use of a naphthenic oil and lead stearate and that readily processable oil extended ionomers containing 100 phr oil can be prepared which have good physical properties.

EXAMPLE 5

Using the polymer described in Example 1 and the procedure of Example 3 an oil extended polymeric hydroxyalkylsulfonate was prepared using 150 parts of Sunpar 2280, a paraffinic process oil, per 100 parts of polymer.

To the oil extended stock on a rubber mill was added and mixed 90 meq (26.6 g) of magnesium stearate/100 polymer. Samples for testing were prepared as described in the other examples.

The resultant oil extended magnesium ionomer had a melt index at 190° C. and 43 psi of 1.4 g/10 min. The magnesium ionomer is more highly associated than the zinc or lead ionomers, yet an easily processable oil extended magnesium ionomer is easily prepared according to the process of this invention. The oil extended magnesium ionomer had a tensile strength of 220 psi and an elongation of 550 psi. It had a Rex Durometer, Type A hardness of 22.

This example illustrates the use of magnesium stearate, a paraffinic process oil, and an oil level of 150 phr.

Since many modifications and variations of this invention may be made without departing from the spirit or scope of the invention thereof, it is not intended to limit the spirit or scope thereof to the specific examples thereof.

What is claimed is:

1. A process for the manufacture of a sulfonated elastomeric blend, which comprises the following steps:
   (a) dissolving an elastomeric polymer in a solvent to form a cement;
   (b) sulfonating with a sulfonating agent said elastomeric polymer in said cement to form an acid form of a sulfonated elastomeric polymer;
   (c) reacting said acid form of said sulfonated elastomeric polymer with an oxirane to form a hydroxyalkylated sulfonated polymer, said oxirane having the general formula:

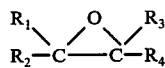

wherein $R_1$, $R_2$, $R_3$ and $R_4$ are independently selected from the group consisting essentially of hydrogen and $C_1$ to $C_{18}$ straight and branched chain acyclic, alicyclic, aryl, alkylaryl, arylalkyl radicals and their functional derivatives;
   (d) recovering said hydroxyalkyl sulfonated polymer from said cement;
   (e) adding about 5 to about 200 parts per hundred by weight of a non-polar process oil to 100 parts of said hydroxyalkylated sulfonated polymer to form a blend of said oil and said hydroxyalkyl sulfonated polymer; and
   (f) reacting said blend of said oil and said hydroxyalkyl sulfonated polymer with a metal containing base to form a neutralized sulfonated elastomeric polymer and a hydroxyalkyl carboxylate ester having the formula:

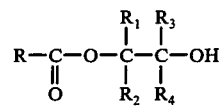

2. A process according to claim 1, wherein said elastomeric polymer has about 0.1 to about 10 mole percent olefinic unsaturation.

3. A process according to claim 1, wherein said elastomeric polymer is selected from the group consisting essentially of EPDM elastomers, butyl rubbers, and mixtures thereof.

4. A process according to claim 3, wherein said EPDM elastomer consists essentially of about 45 to about 80 weight percent of ethylene, from about 10 to about 53 wt.% of an alpha-olefin, and about 2 to about 10 wt.% of a diene monomer.

5. A process according to claim 4, wherein said diene monomer is non-conjugated.

6. A process according to claim 5, wherein said diene monomer is selected from the group consisting essentially of 1,4-hexadiene, dicyclopentadiene, alkenyl substituted norbornenes, alkylidene substituted norbornenes, methylene norbornene, and tetrahydroindiene.

7. A process according to claim 4, wherein said diene is 1,4-hexadiene.

8. A process according to claim 4, wherein said diene is 5-ethylidene-2-norbornene.

9. A process according to claim 1, wherein said elastomeric polymer has an Mn of about 10,000 to about 200,000 and a Mooney viscosity at 212° F. at 8 minutes of about 5 to about 60.

10. A process according to claim 1, wherein said sulfonating agent is selected from the group consisting essentially of a mixture of sulfuric acid and acetic anhydride, an acyl sulfate, complexes of sulfur trioxide donor with a Lewis base and mixtures thereof.

11. A process according to claim 1, wherein said sulfonation occurs in a temperature range of about −100° C. to about 100° C.

12. A process according to claim 1, wherein said solvent is selected from the group consisting essentially of halogenated aliphatic hydrocarbons, halogenated aromatic hydrocarbons, aromatic hydrocarbons, aliphatic hydrocarbons and mixtures thereof.

13. A process according to claim 1, wherein said acid form of said sulfonated elastomeric polymer contains about 10 to about 50 meq SO$_3$H groups per 100 grams of said sulfonated elastomeric polymer.

14. A process according to claimm 1, wherein said process oil is selected from the group consisting essentially of aromatics, naphthenics, paraffinics and mixtures thereof.

15. A process according to claim 1, wherein said process oil is a paraffinic oil having an Mn of at least 300.

16. A process according to claim 1, wherein said process oil has less than about 6 wt.% of polar compounds.

17. A process according to claim 1, wherein said process oil is incorporated into said neutralized sulfonated elastomeric polymer at a concentration level of less than about 200 parts per hundred.

18. A process according to claim 1, wherein said recovery of said hydroxyalkyl sulfonate from said cement further includes steam stripping.

19. A process according to claim 1, wherein said neutralized sulfonated elastomeric polymer has about 15 to about 40 meq. $SO_3H$ groups per 100 grams of said sulfonated elastomeric polymer, at least 90 percent of said hydroxyalkyl sulfonate groups being neutralized with a metal counterion selected from the group consisting essentially of lead, aluminum, iron, antimony, Groups I-A, II-A, I-B and II-B of the Periodic Table of Elements and mixtures thereof.

20. A process according to claim 1, wherein said neutralizing agent is a metallic salt of a carboxylic acid, a metal ion of said metallic salt being selected from the group consisting essentially of iron, lead, aluminum, antimony, Groups I-A, II-A, I-B and II-B of the Periodic Table of Elements and mixtures thereof.

21. A solid, gel-free elastomeric blend composition consisting essentially of:
(a) 100 parts by weight of a neutralized sulfonated elastomeric polymer having about 10 to about 50 meq. of sulfonate groups per 100 grams of said polymer, at least 90 percent of said sulfonate groups being neutralized with a metal counterion;
(b) about 2 to about 50 parts per hundred of a hydroxyalkyl carboxylate ester having the formula:

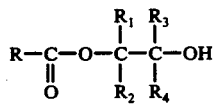

wherein $R_1$, $R_2$, $R_3$ and $R_4$ are independently selected from the group consisting of hydrogen, $C_1$ to $C_{18}$ straight and branched chain acyclic, alicyclic, aryl, alkylaryl, and arylalkyl groups and functional derivatives thereof and mixtures thereof; and (c) about 5 to about 200 parts per hundred of a process oil.

22. A composition according to claim 21, wherein said concentration of said process oil is less than about 150 parts per hundred.

23. A composition according to claim 21, wherein said process oil has less than about 6 wt.% of polar type compounds.

24. A composition according to claim 21, wherein said process oil has an Mn or about at least 300.

25. A composition according to claim 21, wherein said process oil is selected from the group consisting essentially of paraffinics, napthenics and aromatics.

26. A composition according to claim 21, wherein said process oil is a paraffinic having an Mn of at least about 300.

27. A composition according to claim 21, wherein said sulfonated elastomeric polymer is derived from an unsulfonated elastomeric polymer selected from the group consisting of butyl rubber, and EPDM terpolymers.

28. A composition according to claim 27, wherein said EPDM terpolymer consists essentially of about 45 to about 80 wt.% of ethylene, from about 10 to about 53 wt.% of an alpha-olefin, and about 2 to about 10 wt.% of a diene monomer.

29. A composition according to claim 28, wherein said alpha-olefin is propylene.

30. A composition according to claim 28, wherein said diene is non-conjugated.

31. A composition according to claim 28, wherein said diene is selected from the group consisting essentially of 1,4 hexadiene, dicyclopentadiene, alkenyl substituted norbornenes, alkylidene substituted norbornenes, methylene norbornene, and tetrahydroindene.

32. A composition according to claim 28, wherein said diene is 5-ethylidene-2-norbornene.

33. A composition according to claim 21, wherein said metal counterion is selected from the group consisting essentially of lead, aluminum, iron, antimony, Groups I-A, II-A, I-B and II-B of the Periodic Table of Elements and mixtures thereof.

* * * * *